UNITED STATES PATENT OFFICE.

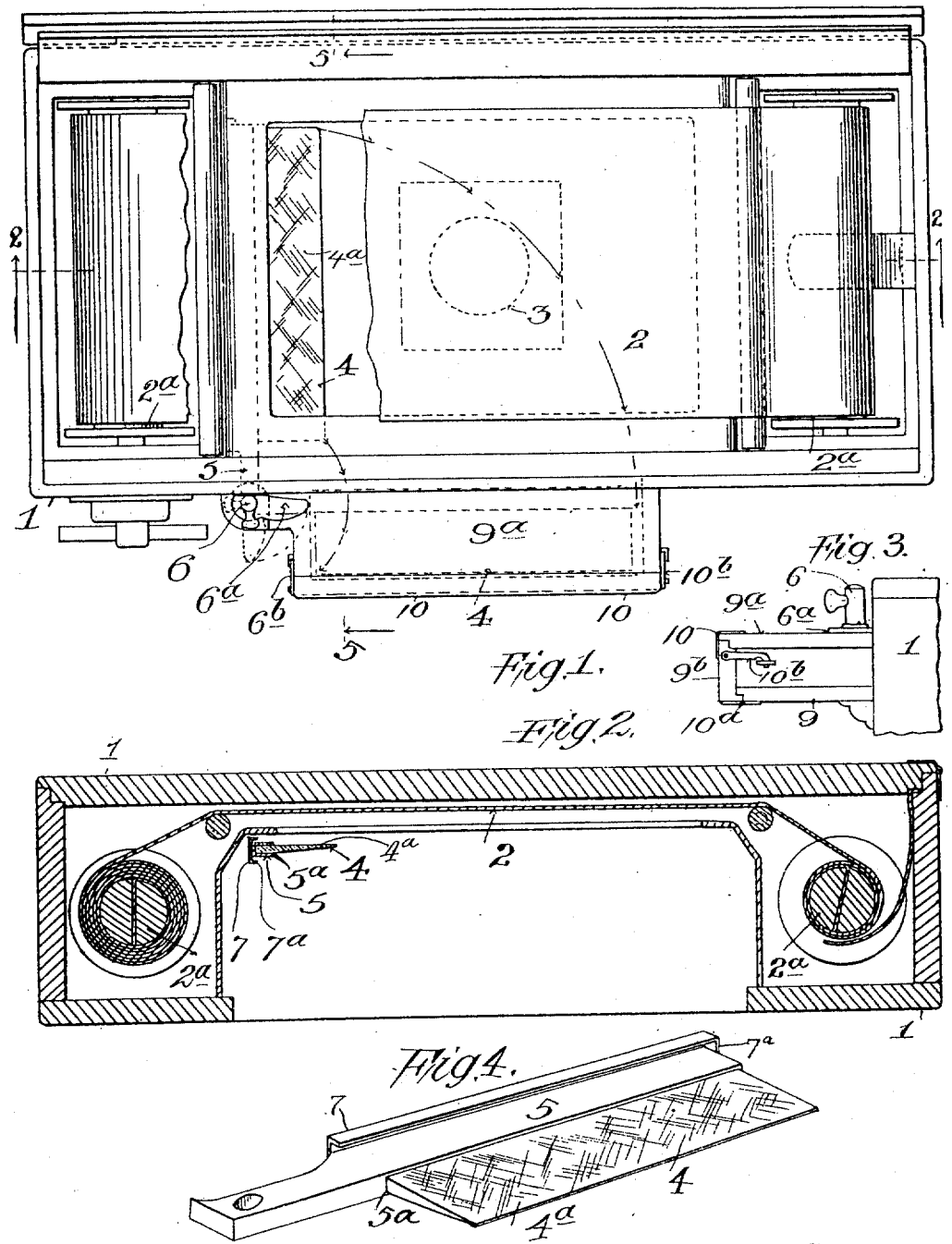

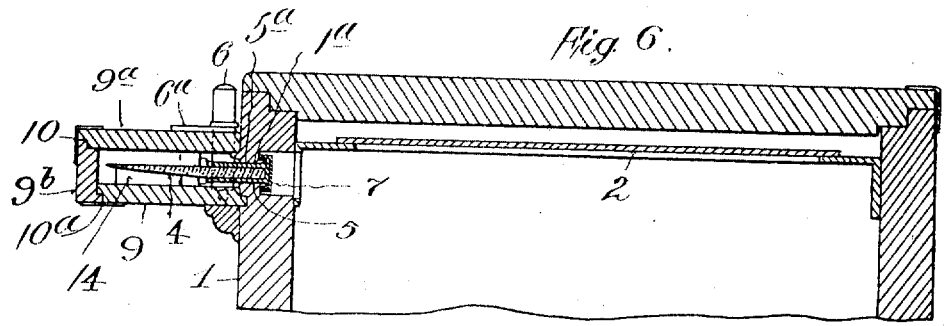
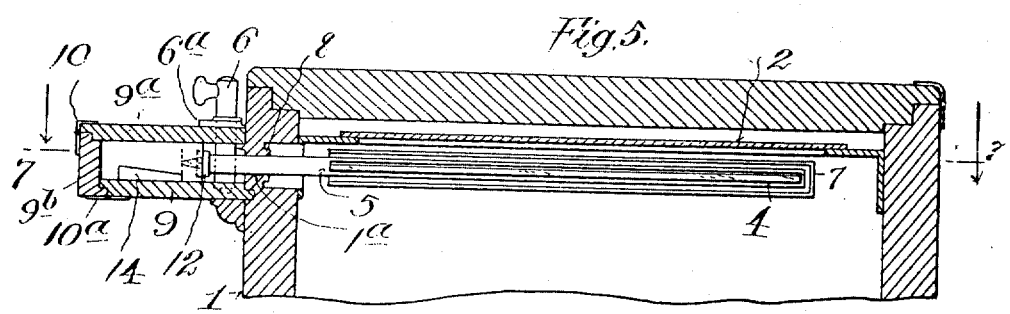
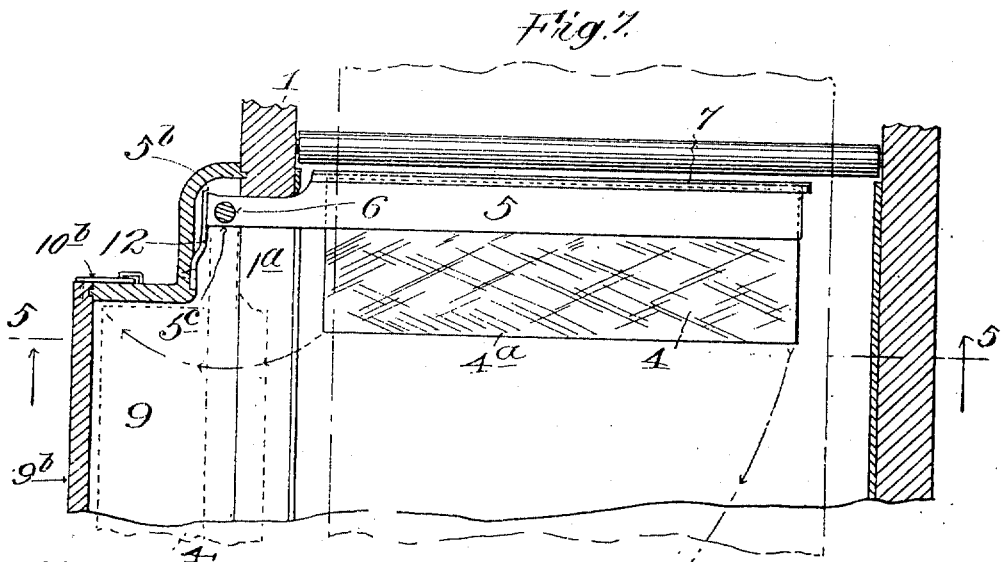

HENRY J. GAISMAN, OF NEW YORK, N. Y., ASSIGNOR TO EASTMAN KODAK COMPANY, OF ROCHESTER, NEW YORK, A CORPORATION OF NEW YORK.

PHOTOGRAPHIC APPARATUS.

1,249,612.  Specification of Letters Patent.  Patented Dec. 11, 1917.

Application filed March 29, 1912. Serial No. 687,017.

*To all whom it may concern:*

Be it known that I, HENRY J. GAISMAN, a citizen of the United States, and resident of New York city, borough of Manhattan, in the county of New York and State of New York, have invented certain new and useful Improvements in Photographic Apparatus, of which the following is a specification.

The object of my invention is to provide improved means to permit photographing upon a sensitized element, such as a plate or film desired designations or indications that are produced at will upon a strip, plate or member that is adapted to permit the passage of light therethrough. I term said strip or member translucid, meaning thereby transparent, substantially transparent or translucent.

In carrying out my invention I provide means for supporting such strip, plate or member in such manner that it may be moved outside of the camera to enable it to be written upon, and may be moved within the camera in front of the sensitive surface of the film for exposure through the lens, to cause such designations upon the strip, plate or member to be photographed upon the film when the film is exposed in ordinary manner.

My invention comprises novel details of improvement and combinations of parts that will be more fully hereinafter set forth and then pointed out in the claims.

Reference is to be had to the accompanying drawings forming part hereof, wherein, Figure 1 is a partly broken plan view of a camera embodying my invention;

Fig. 2 is a section on the line 2, 2, in Fig. 1;

Fig. 3 is an end view of part of Fig. 1, looking from the right hand side;

Fig. 4 is an enlarged perspective view of the translucid strip, plate, or member and its holder;

Fig. 5 is a cross section substantially on the line 5, 5, in Figs. 1 and 7;

Fig. 6 is a similar view, showing the translucid strip and its holder in a different position from that shown in Figs. 1 and 5, and Fig. 7 is a section on the line 7, 7, in Fig. 5.

Similar numerals of reference indicate corresponding parts in the several views.

At 1 is indicated a camera or photographic apparatus which may, generally, be of any suitable or well-known construction, and may be adapted for use with films or sensitized elements of any usual or well-known character, such as flexible films or plates, supported and operated in any well-known manner. The film is shown carried by the spools $2^a$, and adapted to receive light from a lens 3 in ordinary manner. At 4 is a strip, slip, plate or member of translucid material, such as glass, gelatin, celluloid or the like, upon which may be written a name, initial, date, object photographed or other desired indication or designation, to be placed in front of the sensitive face of the film or plate to photograph such indication thereon upon exposure of the film. The strip or plate 4 may have a roughened surface, as indicated at $4^a$, as ground glass, for writing thereon as with a pencil, or may have a smooth surface adapted to receive manual markings according to the nature of the material. I have shown a holder 5 for said strip or plate 4 to enable the latter to be inserted into and withdrawn from the camera. Said holder may be of any suitable construction adapted to permit the strip or plate 4 to be inserted and removed as required. I have shown said holder as provided with a recess forming jaws $5^a$, receiving one edge of strip or plate 4. The holder 5 is shown supported so as to be retained without or on the exterior of the camera to permit writing on the strip or plate, and to be moved into the camera to retain the strip or plate in front of the sensitive surface of the film. While the holder may be supported for such purpose in any desired manner, I have shown the holder pivotally supported near one of its ends adjacent one side of the camera. For this purpose holder 5 is carried by a shaft or stud 6 pivotally supported by the camera whereby said holder may be swung into and substantially out from the camera. To permit strip 5 to pass through a side wall of the camera, I have shown one of the walls provided with an opening or slot $1^a$, shown of such dimensions as to permit holder 5 to pass through such slot to substantially fill such opening and expose the strip or plate 4 on the exterior of the camera (see Fig. 6). To prevent light striking through slot $1^a$ into the camera, when strip or plate 4 is exposed on the exterior of the camera, as in Fig. 6, I have shown means carried by the holder and the camera to coact to fully close opening 1ª. For this purpose holder 5 is provided, at the edge opposite strip 4, with a band, channel piece or binding 7 of suitable material, the extended edges 7ª of which are at a distance from holder 5 and adapted to receive ribs 8, (Fig. 5), located along and on opposite sides of the inner edges of opening 1ª, whereby when the holder is in the position shown in Fig. 6, the piece 7 will receive the ribs 8 and prevent the passage of light through slot 1ª (see Fig. 6). I also provide means to close slot or opening 1ª when strip or plate 4 is withdrawn therefrom and placed in front of the film within the camera. For this purpose I have shown a pocket or housing 9, secured at the side of the camera in front of opening 1ª, into which pocket strip 4 is adapted to project, as in Fig. 6. The pocket or housing 9 is adapted to be closed upon all sides, except the side communicating with slot or opening 1ª, and lid 9ª is adapted to be raised or swung away when strip or plate 4 is within the pocket or housing to permit writing upon such strip. For this purpose cover or lid 9ª of pocket 9 is shown hinged, as at 10, at one side of the pocket (see Figs. 5 and 6). To permit ready insertion of strip or plate 4 into and removal from holder 5, in a direction edgewise of the strip, I hinge the side wall 9ᵇ of pocket 9 to the bottom wall by hinges 10ª (Figs. 5 and 6), whereby the lid and side wall may be swung away. The side wall 9ᵇ may be held in place by one or more catches or hooks 10ᵇ, Fig. 3. To retain holder 5 in either of its operating positions, I have shown a spring 12 carried by pocket or housing 9 (see Fig. 7) and adapted to bear against the end 5ᵇ of holder 5 when in the position shown in Fig. 7, and against the edge 5ᶜ of said holder when it is in the position shown in Figs. 1 and 6, to retain said holder from spontaneous movement, and to permit said holder to be swung back and forth as desired.

To permit moving holder 5 back and forth and to prevent light from striking through slot or opening 1ª while the holder and strip 4 are being thus operated, I provide means operative with the holder to keep cover 9ª closed while strip or plate 4 is in front of the film, and to release the cover when strip or plate 4 has been projected into pocket or housing 9, and slot or opening 1ª is closed by the holder. To this end I have shown an extension or finger 6ª, projecting from shaft 6, and arranged to extend over cover or lid 9ª when the holder is turned to present strip or plate 4 in front of the film, as in Fig. 1, and to move to one side of the cover and release the same when holder 5 has been moved outwardly into slot or opening 1ª, the edge of finger 6ª at such time releasing cover 9ª. By this means assurance is given that, if the cover 9ª has been placed over strip 4 while the latter is in pocket or housing 9, the cover will not be accidentally or otherwise opened while the strip 4 is in front of the film, and that slot or opening 1ª will be closed by the outward movement of holder 5, before cover 9ª can be raised.

I have shown strip or plate 4 beveled or tapered outwardly from its rear portion that is held in the holder, so as to prevent, as much as possible, the photographing upon the film or sensitized element of a line that would correspond to an edge which might be produced by the ordinary thickness of the material of the strip. The holder 5 supports strip or plate 4 along one edge of the latter, whereby the holder is not exposed to the sensitive face of the film, so as not to cause photographing thereon of any undesired lines or markings.

In order to aid in supporting the strip when it is in pocket or housing 9, so that it will not be pressed down when being written upon, I have shown a ledge or rest 14 (Figs. 5 and 6) at the bottom of the pocket, upon which the strip 4 may rest, which ledge or rest is shown tapering to conform with the tapering shape of the strip or plate 4.

In using my improvements the photographer, desiring to photograph or produce a designation or indication upon a film or sensitized element, will move holder 5 and strip 4 outwardly into a pocket 9, thereby closing slot or opening 1ª, and will then raise cover 9ª. He may then write upon strip 9, as with a pencil, any desired designation, such as the name, date, object photographed, etc. He will then close cover 9ª to exclude light, and turn holder 5 and strip or plate 4 into the camera in front of the portion of the film to be exposed to the lens, whereupon the cover will be retained in position, and light will be excluded. The photographing will then be done in the usual way, and the writing on strip 4 will be photographed or fixed upon the film. The film may then be moved along for another photograph, leaving the strip in such set position for photographing the same designation on the next film, or the strip may be moved outwardly into the pocket, the cover raised, and the previous designation removed from the strip and another designation written on the strip for use as before described, and so on. Strips or plates may be inserted in holder 5 whenever desired, or the same strip or plate may be used and written upon as often as desired, according to the material of such strip.

It will thus be understood, also, that by leaving strip 4 in pocket 9, or by not writing anything upon the strip, photographing may be done in usual manner, producing no designations upon the film, but that when it is desired to produce designations upon the film, it will merely be necessary to write upon the strip, and place the same in front of the film as stated.

By the term "sensitized element" I mean a sensitive film or plate of any well known character, and by the term "strip" I mean a translucid member of suitable material adapted to receive manual markings to be photographed upon the sensitized element when placed in the field of exposure thereof.

Changes may be made in the details of construction and arrangements of parts set forth, within the scope of the appended claims, without departing from the spirit of the invention.

While I have used the term "camera" in the claims to designate the apparatus to which my invention is applied, it is to be understood as meaning a device for holding the sensitized material in position for exposure, and so far as the invention is concerned, it is immaterial whether a lens and shutter form a part of the structure of the holder or not, or whether the holder is a separate structure to be applied to a camera.

In so far as the feature of manually applying designations to a strip outside of the camera or holder and then light printing such designations upon the sensitized element by the light passing from the lens, this application is a continuation of my former application, Serial No. 616,428, filed March 23rd, 1911.

It will be noted that the flange 7 on the holder for the translucid strip and the casing formed by parts 9, 9ª and 9ᵇ, constitute what might be termed a light lock or pocket in that the strip is movable into the pocket when the outer part is inclosed and then after the flange 7 closes against the casing, the outer part may be opened and the strip exposed for writing without liability of fogging the sensitized material.

Having now described my invention what I claim is:—

1. The combination with a camera, of a holder for supporting a translucid strip in front of the contained sensitized material, said camera having an opening for the passage of the strip to a position to be written upon and means for closing said opening, and means to support the strip while being written upon outside the field of exposure.

2. The combination with a camera, of a holder for supporting a translucid strip in front of the contained sensitized material, said camera having an opening for the passage of the strip, said holder having means for closing said opening when the strip is passed outside the camera.

3. The combination with a camera provided with an opening for the passage of a translucid strip, of a holder for said strip movably supported by the camera to permit the strip to enter the camera said holder being provided with means to close said opening when said strip is moved outside the camera.

4. The combination with a camera having an opening for the passage of a translucid strip, of a laterally movable holder adapted to hold the strip projected on one side of said opening, and means on the holder to close said opening when the strip is projected therefrom.

5. The combination with a camera having an opening for the passage of a translucid strip, of a holder adapted to hold the strip projected on one side of said opening, said holder having means to close said opening when the strip is projected outwardly therefrom.

6. The combination with a camera having an opening for the passage of a translucid strip and ribs adjacent the inner edges of said opening, of a holder adapted to hold the strip projected from said opening, said holder having means to coact with said ribs to close said opening when the strip is projected outwardly.

7. The combination with a camera having an opening for the passage of a translucid strip and ribs adjacent the inner edges of said opening, of a holder adapted to hold the strip at one side of the holder and to project the strip from said opening, said holder having a channel piece on the side opposite the strip to coact with said ribs to close said opening when the strip is projected outwardly.

8. The combination with a camera having an opening and a pocket alined with said opening, said pocket having a movable wall, of a translucid strip adapted to project through said opening into said pocket, and means for movably supporting said strip either in front of the sensitized element in the camera or within the pocket.

9. The combination with a camera having an opening and a pocket alined with said opening, said pocket having a movable closure for the pocket, of a translucid strip adapted to project through said opening into said pocket, and means for movably supporting said strip to hold it either in front of the sensitized element contained in the camera or in said pocket.

10. The combination with a camera having an opening, and a pocket alined with said opening, said pocket having a movable wall, of a holder for a translucid strip adapted alternatively to project the strip through said opening into the pocket or to hold the strip in front of the contained sensitized element, means for supporting and operating said holder, and means controlled by said first named means for retaining said wall closed when the strip is out of the pocket.

11. The combination with a camera having an opening, and a pocket alined with said opening, said pocket having a movable wall, of a holder for a translucid strip adapted alternatively to project the strip through said opening into the pocket or to hold the strip in front of the contained sensitized element, and means for supporting and operating said holder, said means having a member to hold said wall closed when the strip is out of the pocket.

12. The combination with a camera having an opening and a pocket alined with said opening, said pocket having a movable wall, of a holder for a translucid strip adapted alternatively to project the strip through said opening into the pocket or to hold the strip in front of the contained sensitized element, and a shaft movably supporting said holder and provided with a member to coact with said wall to hold the latter closed when the strip is out of the pocket and to release said wall when the strip is in the pocket.

13. The combination with a camera provided with an opening for the passage of a translucid strip, of a holder adapted to project the strip through said opening, means to pivotally support said holder on the camera, and a spring coacting with said holder alternatively to retain the strip in front of the contained sensitized element or to retain the strip projected outside said opening.

14. A camera provided with an opening and with means to movably support a translucid strip so that it may be either located within the camera in front of the contained sensitized element or may be projected outside the camera casing through the opening and means to prevent light from striking through said opening into the camera while the strip is being moved relatively thereto.

15. A camera provided with an opening and with means to movably support a translucid strip so that it may be either located within the camera in front of the contained sensitized element or may be projected outside the camera casing through the opening, and means to prevent light from striking through said opening into the camera while the strip is being moved relatively to the sensitized element.

16. A camera provided with an opening and with means to movably support a translucid strip so that it may be either located within the camera in front of the contained sensitized element or may be projected outside the camera casing through the opening and means to prevent light from striking through said opening into the camera while the strip is being removed therefrom.

17. A camera provided with an opening and with means to movably support a translucid strip so that it may be either located within the camera in front of the contained sensitized element or may be projected outside the camera casing through the opening, 70 and means to prevent light from striking through said opening into the camera while the strip is being moved therein and removed therefrom.

18. A camera provided with an opening and having a pocket outside the camera casing and registering with said opening, movable means to support a translucid strip either within the camera in front of the contained sensitized element or within said pocket, and means to prevent light from entering the camera when the strip is moved through the opening.

19. A camera provided with an opening and having a pocket outside the camera casing and registering with said opening, a rest within said pocket, a translucid strip, and movable means for movably supporting said strip either in said pocket in position to bear upon said rest or in front of the sensitized element in the camera.

20. The combination with a container for sensitized photographic material and into which light may be admitted, of a translucid strip adapted to receive markings to be light printed on the sensitized material, means whereby the strip may be moved either into the container to intercept light passing to said material, or outside of the container and a light lock outside the container into which said strip is moved and which may be opened to permit writing on the strip.

21. The combination with a container for sensitized photographic material, into which light may be admitted and which has an opening therein, of a translucid strip adapted to receive markings to be light printed on the sensitized material and means whereby the strip may be moved either into the container to intercept light passing to said material or through the opening to the outside of the container and a light lock outside the container into which the strip is movable and which may be opened to receive writing upon it, said lock embodying a chamber, two closures and means for securing said closures alternatively.

22. The combination with a container for sensitized photographic material and into which light may be admitted, said container having an opening therein, of a translucid strip, means whereby the strip is movable through said opening either into a position in the container to intercept light passing to the sensitized material or to a position to project outside the container, and means for preventing the entrance of light to the container during and after the passage of said strip through the opening.

23. The combination with a container for a photographic sensitive element, said container having a light aperture for the exposure of said element and a supplemental opening, a light lock for said opening, of a writing strip capable of bearing designating marks and of transmitting light, a movable support to hold said strip between the sensitive element and the light aperture for recording the markings on the element and a manipulator for the support projecting exteriorly through said opening when the strip is held in such recording position, said strip being movable through the opening by means of the manipulator.

24. The combination with a container in which sensitized photographic material is adapted to be exposed, said container having an opening to the exterior, of a holder for a strip of material adapted to contain markings, said holder being pivoted to the container on an axis extending perpendicular to the plane of exposure of the sensitized material, said holder being adapted to move the strip either to project outside the container through the opening or inside the container in front of the sensitized element and means for preventing the passage of light through said opening.

25. The combination with a container in which sensitized photographic material is adapted to be exposed, said container having an opening to the exterior, of a strip of translucent material adapted to receive markings thereon and to be passed through said opening into proximity to the film to be exposed, means for preventing the passage of light into the holder, and means for moving said strip into and out of proximity to the contained sensitized material while protected from light.

Signed at New York city, in the county of New York, and State of New York, this 28th day of March, A. D. 1912.

HENRY J. GAISMAN.

Witnesses:
 T. F. BOURNE,
 MARIE F. WAINWRIGHT.